(12) United States Patent
Hebbar

(10) Patent No.: US 9,936,055 B2
(45) Date of Patent: Apr. 3, 2018

(54) USING MULTICASTING TO CONCURRENTLY IMAGE MULTIPLE CLIENT DEVICES

(71) Applicant: Dell Products L.P., Round Rock, TX (US)

(72) Inventor: Chaithra Hebbar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 177 days.

(21) Appl. No.: 15/007,472

(22) Filed: Jan. 27, 2016

(65) Prior Publication Data

US 2017/0214727 A1 Jul. 27, 2017

(51) Int. Cl.
G06F 15/16 (2006.01)
H04L 29/08 (2006.01)
H04L 29/06 (2006.01)

(52) U.S. Cl.
CPC ............ *H04L 69/326* (2013.01); *H04L 67/42* (2013.01)

(58) Field of Classification Search
CPC .... H04L 65/4076; H04L 67/42; H04L 69/326
See application file for complete search history.

(56) References Cited

U.S. PATENT DOCUMENTS

| | | | | |
|---|---|---|---|---|
| 6,587,634 B2 * | 7/2003 | Maltz | ................... | G11B 27/034 340/7.1 |
| 7,206,310 B1 * | 4/2007 | Chen | ..................... | H04L 49/201 370/389 |
| 7,246,369 B1 * | 7/2007 | Duan | .................. | H04N 7/17318 348/E7.071 |
| 2003/0206549 A1 * | 11/2003 | Mody | ................. | H04L 12/1881 370/390 |
| 2004/0057459 A1 * | 3/2004 | Sharony | .................. | H04L 47/14 370/468 |
| 2004/0100986 A1 * | 5/2004 | Lee | ...................... | H04L 12/4035 370/443 |
| 2005/0216812 A1 * | 9/2005 | Leon | ..................... | H04L 1/1887 714/748 |
| 2007/0011302 A1 * | 1/2007 | Groner | ................ | G06F 11/1076 709/224 |
| 2008/0095096 A1 * | 4/2008 | Cho | ........................ | G01C 21/26 370/328 |
| 2008/0151775 A1 * | 6/2008 | Balint | ................... | H04L 1/1887 370/253 |
| 2010/0077174 A1 * | 3/2010 | Ma | ........................ | G06F 9/5011 711/171 |
| 2010/0177642 A1 * | 7/2010 | Sebastian | ............ | H04L 12/1859 370/248 |

(Continued)

*Primary Examiner* — Jonathan A Bui
(74) *Attorney, Agent, or Firm* — Kirton McConkie; Brian Tucker

(57) ABSTRACT

An update can be multicast to a number of client devices. By multicasting an update, the update can be concurrently distributed to a large number of client devices using a single network transmission. This greatly reduces the amount of time required to update the client devices as well as the amount of bandwidth that is required to transfer the update over the network. As part of this multicasting process, the client device, which may have missed a segment of the multicast, can request the missed segment. The missed segment can then also be multicast to eliminate or minimize the redundant transmission of the missed segment.

20 Claims, 9 Drawing Sheets

(56) References Cited

U.S. PATENT DOCUMENTS

| | | | |
|---|---|---|---|
| 2012/0084390 A1* | 4/2012 | Hara | G06F 8/63 |
| | | | 709/217 |
| 2013/0308635 A1* | 11/2013 | Chen | H04N 21/2662 |
| | | | 370/390 |
| 2014/0310735 A1* | 10/2014 | Brown | H04N 21/2543 |
| | | | 725/1 |
| 2014/0366076 A1* | 12/2014 | Suh | H04N 21/235 |
| | | | 725/116 |
| 2015/0110056 A1* | 4/2015 | Wang | H04W 72/005 |
| | | | 370/329 |
| 2016/0112368 A1* | 4/2016 | Volach | H04W 4/08 |
| | | | 709/223 |
| 2016/0182966 A1* | 6/2016 | Hao | H04N 21/234 |
| | | | 725/116 |
| 2016/0294898 A1* | 10/2016 | Wheelock | H04L 65/4076 |
| 2017/0026431 A1* | 1/2017 | Oren | H04L 65/4076 |
| 2017/0070758 A1* | 3/2017 | Phillips | H04N 21/2385 |
| 2017/0214727 A1* | 7/2017 | Hebbar | H04L 67/42 |

* cited by examiner

USING MULTICASTING TO CONCURRENTLY IMAGE MULTIPLE CLIENT DEVICES

CROSS-REFERENCE TO RELATED APPLICATIONS

N/A

BACKGROUND

The present invention is generally directed to using multicasting to concurrently image multiple client devices. The present invention is particularly applicable to deploying an image or other update to a large number of thin clients over a network at the same time.

Thin clients are client devices that rely on a server to fulfill its computational roles. For example, the server may execute the operating system and applications that are made accessible at the thin client with the thin client only executing the minimal components required to implement a remote display protocol for communicating with the server. This is in contrast to so-called fat clients which are client devices that can operate independently of the server. Although the present invention is particularly beneficial in client/server environments that include a large number of thin clients, the present invention can be implemented in any client/server environment.

Many entities that maintain a client/server environment desire to periodically update the client devices. One way in which these updates can be performed is by imaging the client devices over a network (e.g., a LAN). In particular, there are various device management tools that can be deployed in a client/server environment to allow IT personnel to remotely manage the client devices. One example of a device management tool is the Dell Wyse Device Manager.

With such device management tools, an individual client device can be easily updated remotely by using a network protocol to transfer an image to the client device. However, if the number of client devices is large, this process of individually updating the client devices becomes a very long and tedious process. For example, if an IT administrator is tasked with updating a subnet of 1000 thin clients, and if the device management tool is configured to allow a maximum of seven simultaneous connections, it can take upwards of ten hours to complete the task (assuming it takes around four minutes to perform a single update). Also, during this update process, the performance of the device management tool will be slowed due to the heavy load. Further, the transmission of the update (e.g., an image) to the large number of thin clients consumes a large amount of bandwidth which may impede other network communications/processes.

BRIEF SUMMARY

The present invention extends to methods, systems, and computer program products for using multicasting to concurrently image (or update) multiple client devices. By multicasting an update, the update can be concurrently distributed to a large number of client devices using a single network transmission. This greatly reduces the amount of time required to update the client devices as well as the amount of bandwidth that is required to transfer the update over the network. As part of this multicasting process, the present invention can provide a way for a client device that may have missed a portion of the multicast to request the missed portion. The missed portion can then also be multicast to eliminate or minimize the redundant transmission of the missed portion. For example, if a number of client devices missed the same portion of the multicast, the missed portion can again be multicast so that all of the client devices that missed it can receive it. This eliminates the need to independently send the missed portion to each of the client devices that missed it.

In one embodiment, the present invention is implemented as a method, performed by a multicast server, for multicasting an update to a number of client devices. A number of segments of an update can be multicast to the client devices. Each segment can comprise application layer data that is provided to a transport layer API for transmission via the multicast. A communication can then be received from a first client device. The communication can identify one or more segments of the update that the first client device did not receive. In response, the one or more segments of the update identified in the communication can be multicast to the client devices thereby enabling any other client devices to also receive the one or more segments.

In another embodiment, the present invention is implemented as one or more computer storage media storing computer executable instructions which when executed by a multicast server implement a method for multicasting an update to a number of client devices. Control information which defines a total size of an update to be multicast and a segment size for segments of the update can be multicast to the client devices. Each segment can comprise application layer data that is provided to a transport layer API for transmission via the multicast. The segments of the update can also be multicast to the client devices. A communication can then be received from a first client device. The communication can identify one or more segments of the update that the first client device did not receive. In response, the one or more segments of the update identified in the communication can be multicast to the client devices thereby enabling any other client devices to also receive the one or more segments. In another embodiment, the present invention is implemented as a method for updating thin clients. One thin client can be selected from among the thin clients to function as a multicast server. A schedule can be transmitted to the thin clients. The schedule can define a time when an update will be multicast to the thin clients. At the scheduled time, the multicast server can multicast the update to the thin clients. The multicast server can receive a communication from a first thin client. The communication can identify one or more segments of the update that the first thin client did not receive during the multicast. In response, the multicast server can re-multicast the one or more segments.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "update" should be construed as computer-executable code that when executed updates, modifies, or adds computer-executable code on a client device. Examples of updates include updates to the entire system (i.e., a system image), updates to a portion or component of the system (e.g., a driver update), add-ons, patches, etc. The term "network" should be construed as encompassing any type of network capable of performing multicasting. The term "segment" should be construed as a portion of application layer data, or more particularly, a portion of an update that can be provided to a transport layer API (e.g., a UDP socket) for transmission via multicasting.

Multicasting is a term of art that refers to the distribution of a communication to a group of recipients concurrently. Multicasting is typically implemented at the internet layer (i.e., IP multicasting), but can also be implemented at the data link layer using techniques such as Ethernet multicast addressing, Asynchronous Transfer Mode point-to-multipoint virtual circuits, or Infiniband multicast. The present invention will be described with reference to embodiments that employ IP multicasting. However, the present invention should be construed as encompassing other types of multicasting.

Figure 1:
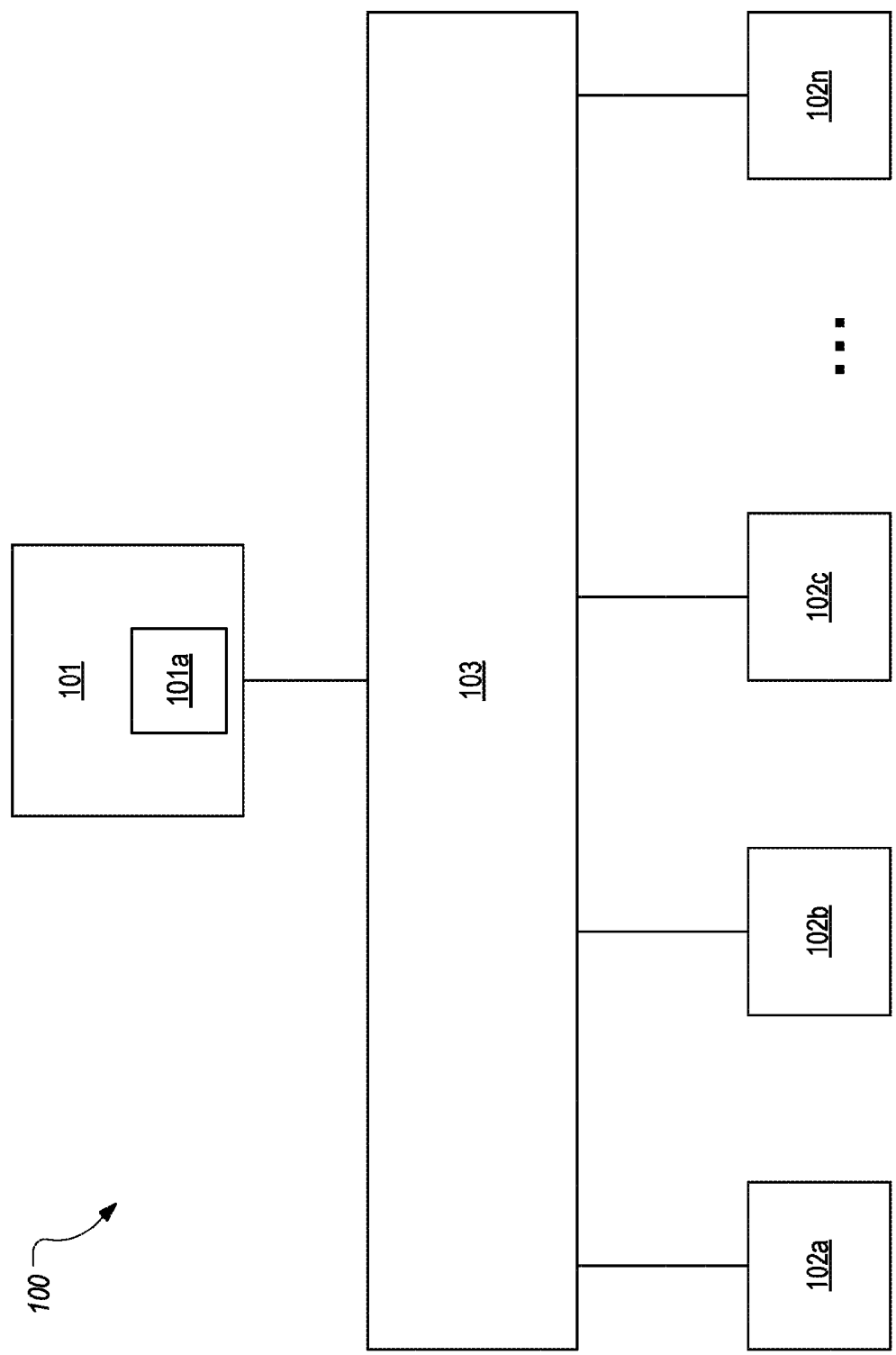
FIG. 1 illustrates an example computing environment in which the present invention can be implemented.

FIG. 1 illustrates an example networked environment 100 in which the present invention can be implemented. Networked environment 100 includes a management server 101 and a number of client devices 102a-102n (generally referred to as client device 102) that are interconnected via a network 103. Network 103 can include any number and configuration of network components (e.g., switches and routers) and can generally represent any type of network or portion thereof (e.g., a subnet, a LAN, a WAN, etc.). For simplicity, network 103 is drawn generically as a box since the exact configuration of network 103 is not essential to the invention.

Management server 101 can represent the computing device on which a device management tool 101a executes. Device management tool 101a can be configured to monitor and manage client devices 102a-102n. In preferred embodiments, client devices 102a-102n can represent a large number of thin clients. However, client devices 102a-102n can represent any type and/or number of client devices including combinations of thin clients, fat clients, or other types of clients.

Figure 2:
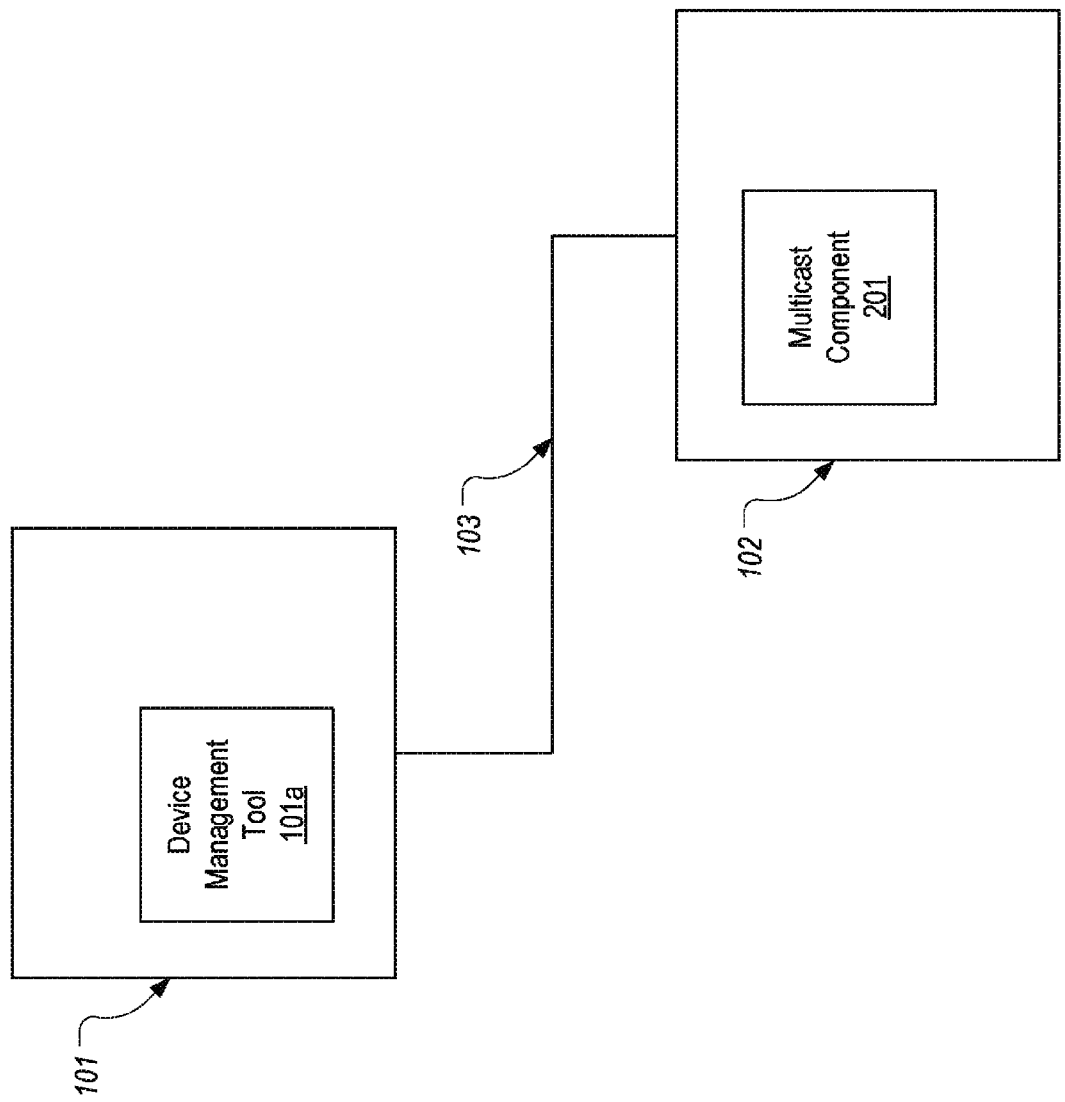
FIG. 2 illustrates an example management server that includes a device management tool for managing client devices and an example client device that includes a multicast component that is configured to enable the client device to transmit and/or receive updates via multicasting.

FIG. 2 provides a more detailed view of management server 101 and a single client device 102. Each client device 102 can include a multicast component 201 that is configured to perform the functionality for receiving an update as will also be further described below. As an overview, multicast component 201 can be configured to listen for network packets transmitted as part of an IP multicast (i.e., network packets transmitted to a particular IP address and port) which contain an update.

Device management tool 101a can provide an interface which allows an administrator to manage client devices 102a-102n. This management can include configuring each client device 102 (i.e., multicast component 201) to listen for multicast packets. In particular, a number of IP addresses are dedicated for performing IP multicasting. Device management tool 101a can be employed to configure the client devices that it manages to listen for multicast packets including a particular IP address (i.e., by configuring the client device's network card to listen to a particular multicast IP address) and on the appropriate port. Alternatively, an administrator could manually configure each client device 102 appropriately or each client device 102 could be pre-configured to listen to a particular multicast IP address/port. In any case, client devices 102a-102n can be configured appropriately to listen for multicasts. For simplicity, this description will assume that all of client devices 102a-102n will be configured to listen to the same multicast IP address on the same port (e.g., 224.1.1.1:15007). However, it is equally possible that different groups of client devices 102a-102n may listen to different multicast IP addresses and/or ports (e.g., to allow each group to be updated independently of other groups using different multicast IP addresses).

Figure 3:
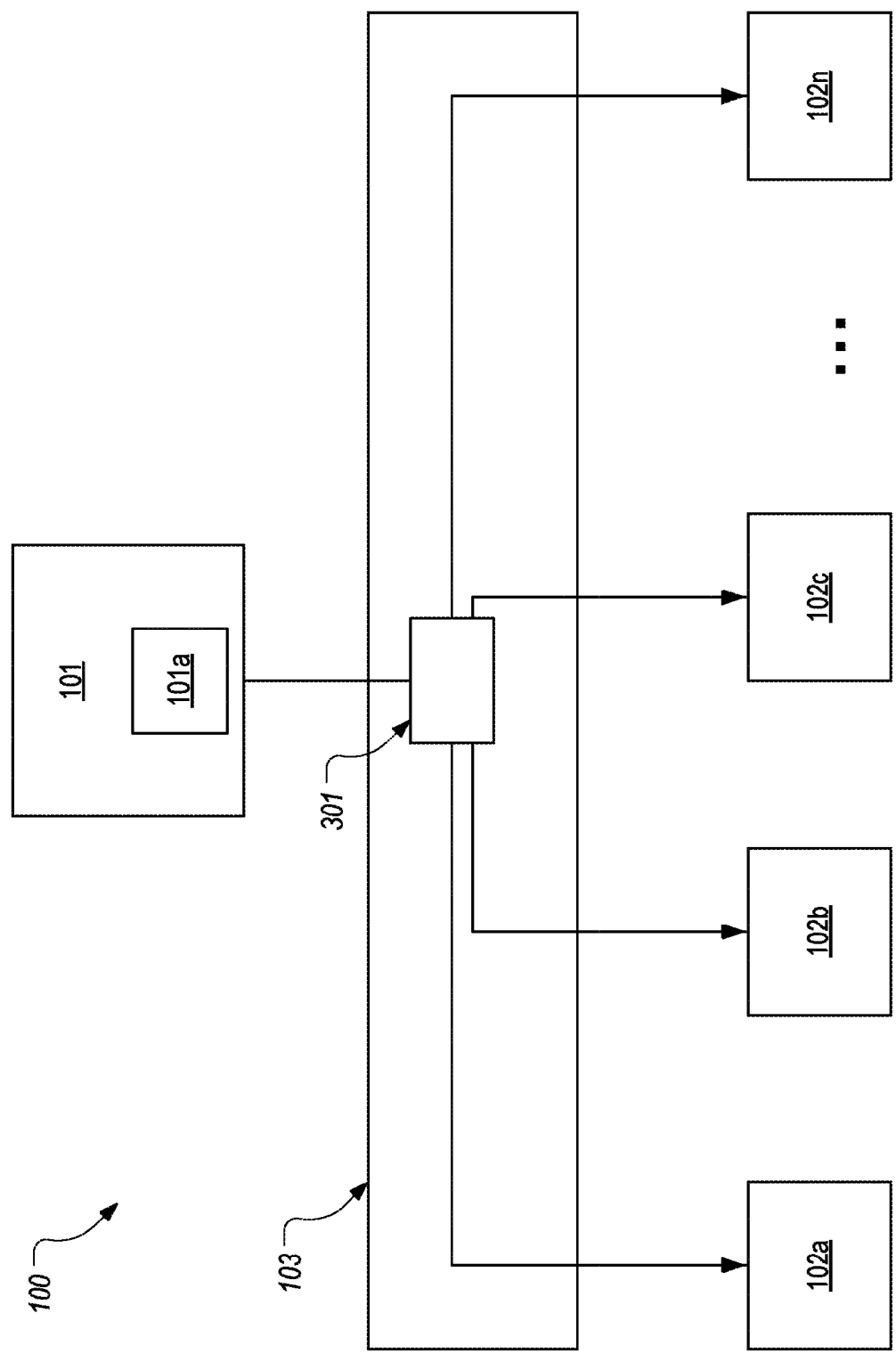
FIG. 3 illustrates how the device management tool can transmit a schedule for multicasting an update.

In accordance with embodiments of the present invention, device management tool 101a can provide an option for deploying an update using an IP multicast. For example, device management tool 101a can allow an administrator to specify an update to be deployed and a schedule for the deployment. In response to such input, device management tool 101a can multicast a schedule 301 to thereby inform each of client devices 102a-102n of the scheduled multicast as is shown in FIG. 3. For example, schedule 301 can specify a time of 1:00 AM for commencing the multicast. It is noted that FIG. 3 depicts the transmission of schedule 301 generally and is not intended to indicate that schedule 301 is a single Ethernet frame, IP packet, or otherwise. Schedule 301 comprises information provided by device management tool 101a to a transport layer socket for multicasting over network 103 whether this information is sent as a single IP packet and/or single Ethernet frame or is segmented into a number of packets and or frames. Also, although not depicted in the figures or described herein, device management tool 101a and/or the appropriate administrator can ensure that other network components (e.g., routers and switches) are configured appropriately to implement multicasting as is understood by one of skill in the art (e.g., by configuring the network components and client devices 102 to employ the Internet Group Management Protocol (IGMP).

When the scheduled time arrives, client devices 102a-102n will initially check in with device management tool 101a. In some embodiments, device management tool 101a can select the first client device to check in to function as the multicast server. For example, if client device 102a checks in first, device management tool 101a can instruct client device 102a to function as the multicast server. As part of this instruction, device management tool 101a can specify what update should be multicast. For example, device management tool 101a could instruct client device 102a to multicast an image of itself (e.g., by reading its flash) or could instruct client device 102a to download an update. In cases where client device 102a multicasts its own image, device management tool 101a could first transfer an update to client device 102a so that its image is updated prior to being multicast. Alternatively, device management tool 101a could select a client device that already has an appropriate image to function as the multicast server regardless of whether the client device is the first to check in. Also, in some embodiments, less than all of client devices 102a-102n may be capable of functioning as the multicast server. For example, only some of client devices 102a-102n may include a multicast component 201 that includes functionality for transmitting a multicast. In such cases, device management tool 101a can select one of client devices 102a-102n that is capable to function as the multicast server.

Figure 4:
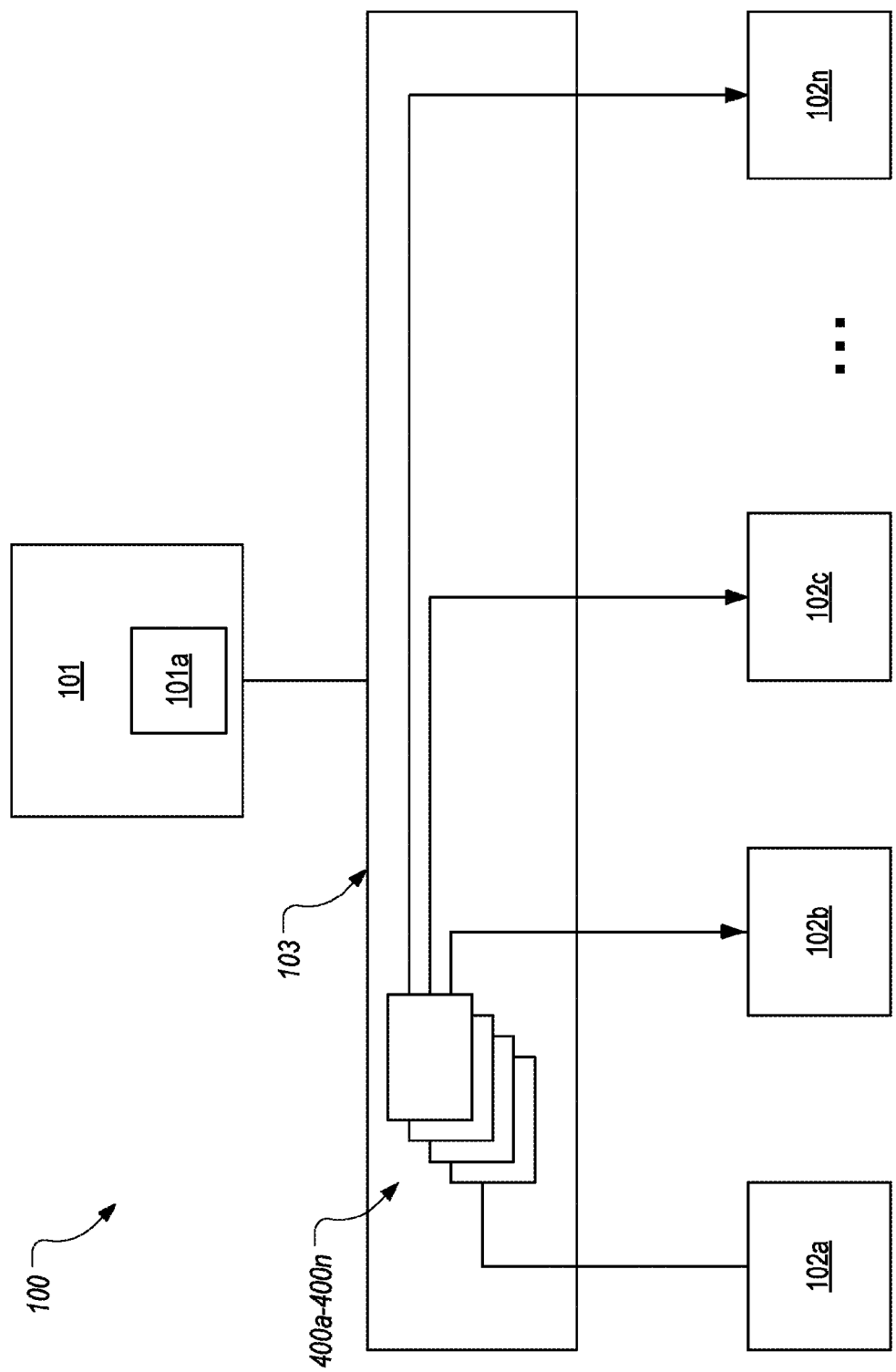
FIG. 4 illustrates how one of the client devices can function as a multicasting server to multicast an update to the other client devices.

Regardless of which client device is selected to function as the multicast server and regardless of what type of update is multicast, the selected client device, which will be assumed to be client device 102a in FIG. 4, will commence multicasting network communications 400a-400n that contain an update. Although beyond the scope of this disclosure, network communications 400a-400n can represent frames of a network access layer protocol (e.g., Ethernet frames). For example, client device 102a can employ its network card to send network communications 400a-400n to a MAC address to which IP address 224.1.1.1 maps in accordance with known IP multicasting techniques. Each network communication 400a-400n can therefore include an IP packet which identifies the appropriate IP multicasting address (e.g., 224.1.1.1) and a port (e.g., 15007). Accordingly, each of client devices 102b-102n, which are listening on port 15007 for packets directed to IP address 224.1.1.1, will receive network communications 400a-400n. In this way, the update can only be transmitted once as part of a multicast as opposed to being unicast to each client device.

Although the manner in which the underlying layers (i.e., the internet and link layers) of the protocol stack implement multicasting is not essential to an understanding of the present invention, the manner in which multicast component 201 interfaces with the transport layer of the protocol stack is important. In particular, as part of the multicast, the client device functioning as the multicast server (e.g., client device 102a) can select an appropriate segment size and other parameters of the multicast (or "control information"). In this context, a segment refers to a portion of the update having a size that is selected by the multicast server. In other words, the multicast server can be tasked with dividing the update into appropriately sized segments which can then each be passed down to the transport layer of the protocol stack (e.g., via a UDP socket) for transmission over network 103. This process of selecting the segment size can also be viewed as selecting the Maximum Transfer Unit ("MTU") for the transport level protocol (e.g., selecting the size of each UDP packet). In some embodiments, this segment size can be initially specified in schedule 301 (e.g., by device management tool 101a) and/or can be periodically multicast by the multicast server (e.g., before and during the multicast). For example, client device 102a (or more particularly, multicast component 201) can be configured to select the appropriate control information for the multicast and can then periodically multicast the control information (e.g., by sending a control packet every 100 or 1000 packets). This control information can also specify a total size of an update which can be used by receiving client devices to determine whether any packets were missed as will be further described below.

Maximum transmission unit (MTU) refers to the size of the largest packet that can be transferred as part of the multicasting. Since the size of the headers generally remains fixed, increasing the MTU results in more data per packet. This increase in the amount of data per packet typically increases throughput because there is less total data being transferred. Also, a larger MTU should decrease the total number of packets required to multicast an update leading to reduced processing requirements at the client device 102. By specifying a MTU, each client device 102 may adjust the size of its UDP receive buffer to accommodate the specified MTU.

By multicasting the update, the bandwidth required to update potentially thousands of thin clients is greatly reduced. Further, multicasting allows a client device to function as the update server. In particular, given the limited processing resources of a typical thin client, it would not be feasible to employ a thin client to concurrently and independently transmit the update to a large number of thin clients. Therefore, the present invention allows updates to be concurrently provided to large numbers of client devices without requiring dedicated and expensive update servers to distribute the update.

In some cases, one or more of client devices 102b-102n may not receive each of network communications 400a-400n, or, in other words, one or more of client devices 102b-102n may receive less than all of the update. For example, a client device 102 may join a multicast after the multicast has begun or one or more of network communications 400a-400n may not reach client device 102a-102n (e.g., because the Ethernet frames are dropped at a router or are dropped by the operating system).

It is noted that the lower layers of the protocol stack implemented on each client device 102 will process each network communication 400a-400n that it receives, including combining any frames/packets that were fragmented, so that the transport layer on each client device 102 will receive the segment of the update. Each client device 102's multicast component 201 can be configured to process the segments that it receives to determine whether it has received each segment of an update.

Figure 4A:
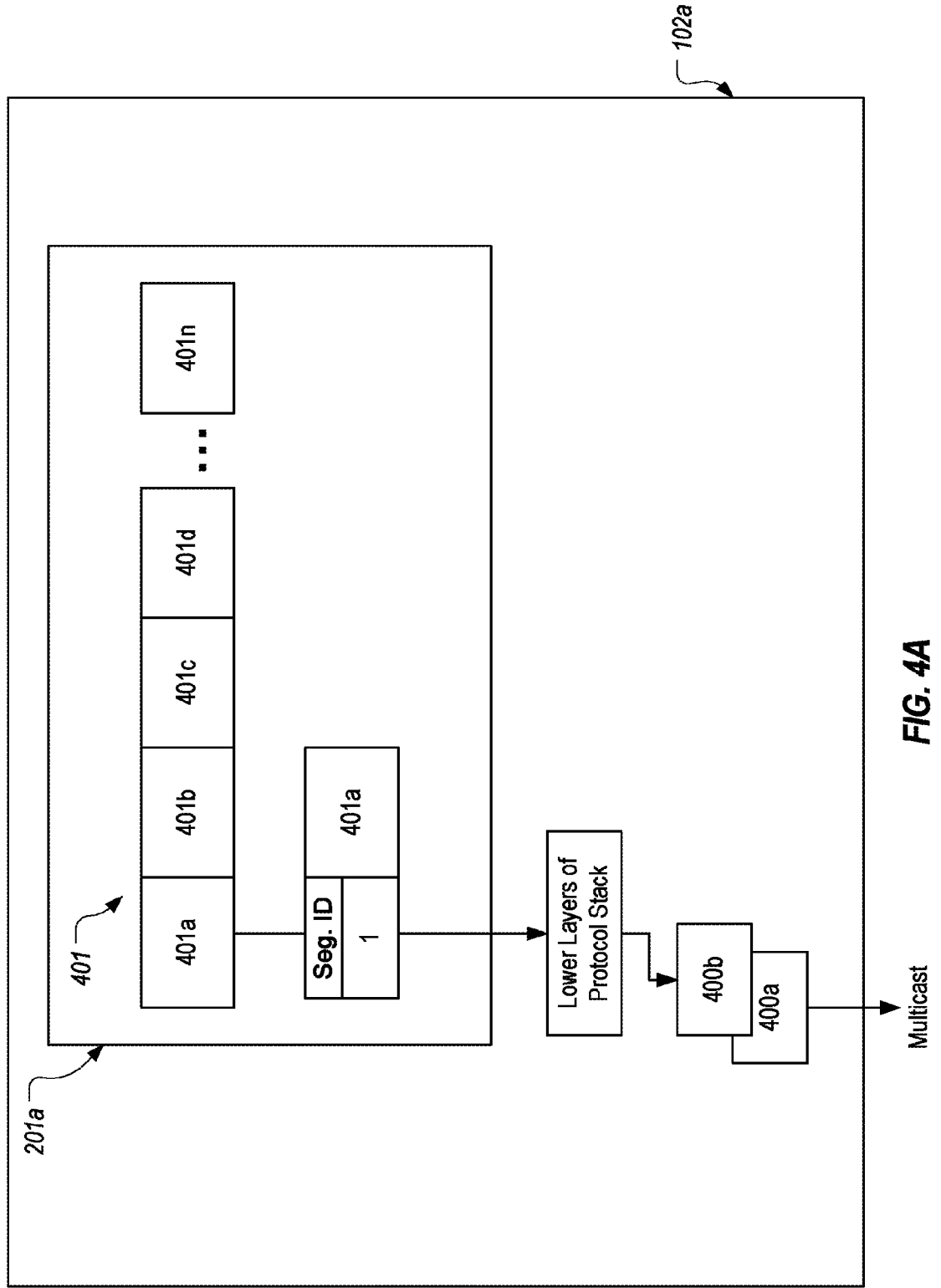
FIGS. 4A-4C illustrate examples of sending and receiving segments of an update via a multicast.

For example, FIG. 4A illustrates how multicast component 201a on client device 102a (which is acting as the multicast server) has divided an update 401 into a number of segments 401a-401n. Multicast component 201a can then append a segment identifier to each segment and provide each segment with the appended segment identifier to the lower layers of the protocol stack for transmission over network 103. In other words, the segment of the update along with its associated segment identifier can be viewed as application layer data from the perspective of the lower layers of the protocol stack. For example, segment 401a and its segment identifier (which is assumed to be 1 in this example) can be passed to a UDP socket. In FIG. 4A, it is assumed that this UDP packet payload is fragmented into two network communications 400a, 400b (which, as an example, can represent two Ethernet frames). However, it is equally possible, depending on the configuration of network 103, that a single network communication (or many network communications) could be used to transmit segment 401a.

Figure 4B:
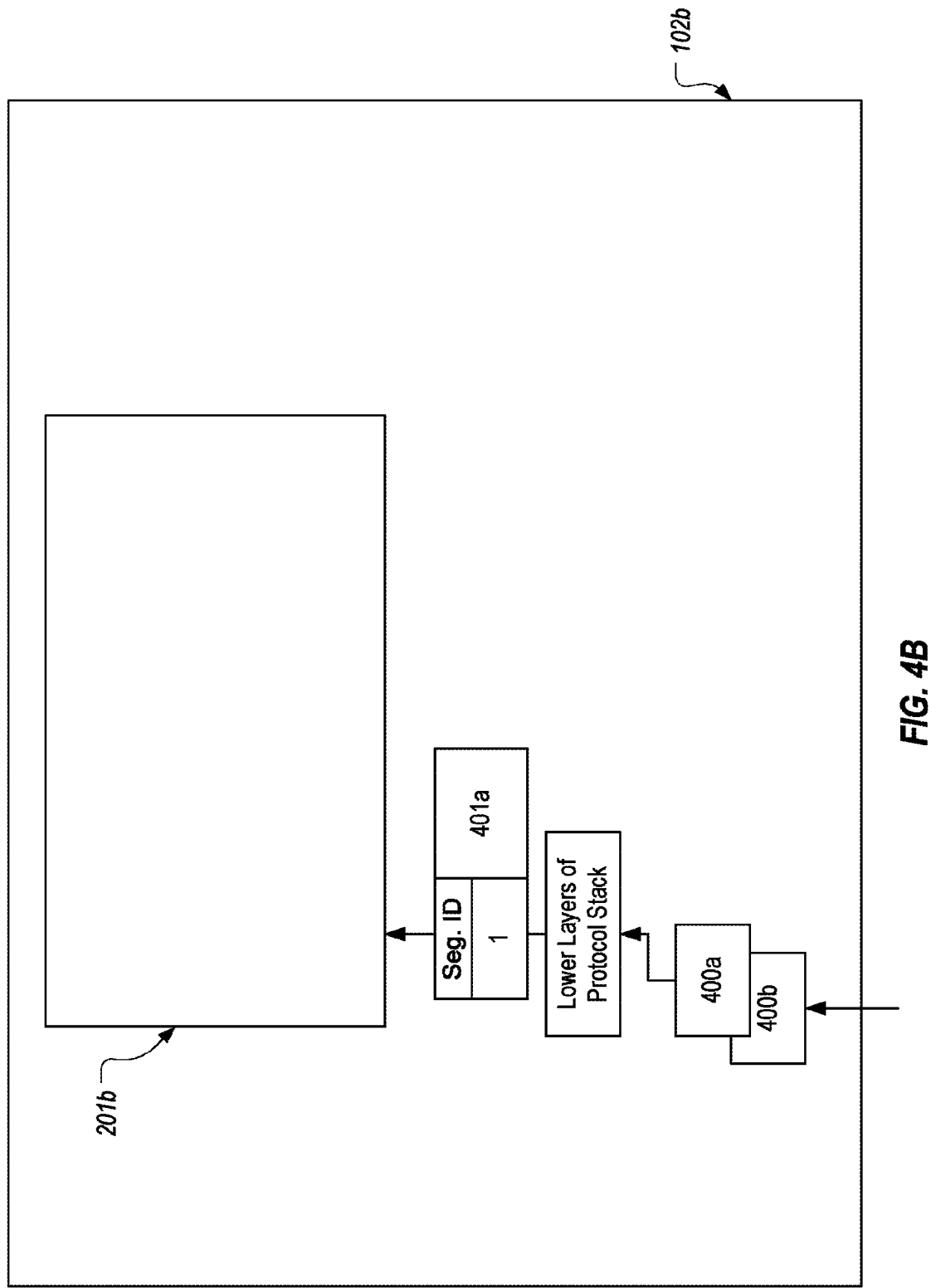

FIG. 4B illustrates how one client device 102b can receive the multicast network communications 400a, 400b in this example. The lower layers of the protocol stack on client device 102b can receive and process network communications 400a, 400b resulting in the UDP socket returning the UDP packet payload (i.e., segment 401a and its corresponding identifier of 1) to multicast component 201b. In this way each segment can be transmitted and received.

Multicast component 201 can employ the segment identifier included with each segment to determine whether it received all segments of update 401. For example, assuming the control information transmitted in conjunction with update 401 indicated that update 401 has a size of 20 MB (or 20480 KB) and that the segment size is 8 KB, multicast component 201 can determine that it should receive 2560 segments having corresponding identifiers between 1 and 2500.

Figure 4C:
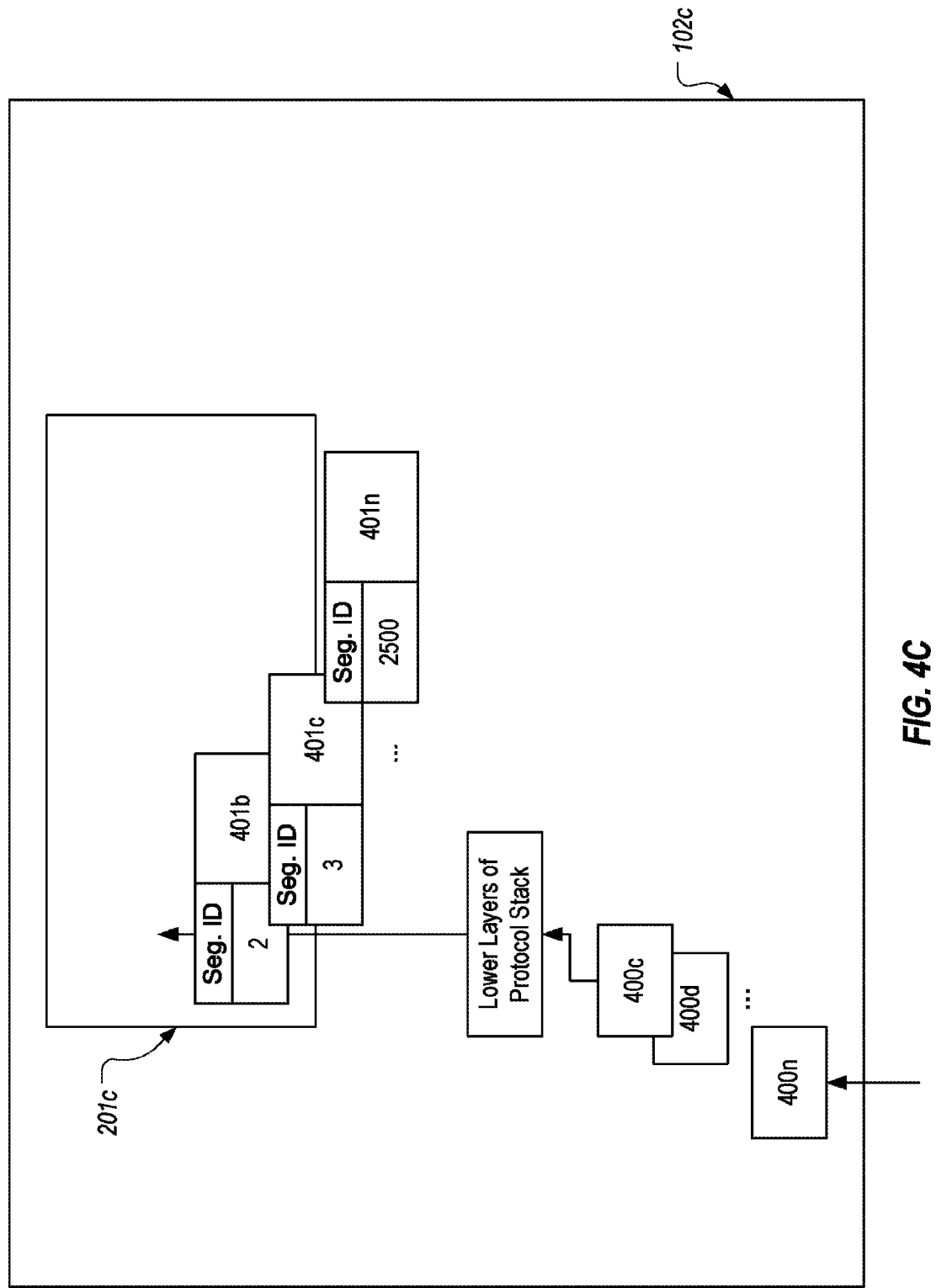

FIG. 4C illustrates how another client device 102c can determine that it did not receive a segment. In this example, it is assumed that client device 102c received network communications 400c-400n but did not receive (or at least did not properly process) network communications 400a and 400b. Therefore, in this example, multicast component 201c is shown as receiving 2499 segments having segment identifiers from 2 to 2500. Based on the control information and the segments that is did receive, multicast component 201c can determine that it did not receive segment 401a (i.e., the segment having an identifier of 1).

When a client device 102 determines that it did not receive one or more segments, the client device can inform the multicast server (e.g., client device 102a) of the segments that it did not receive. In accordance with the techniques of the present invention, the multicast server can then re-multicast the missing segments. By re-multicasting missing segments, the present invention can further minimize the bandwidth required to deploy an update as well as minimize the load on the multicast server. In particular, in an environment where a large number of thin clients are being updated concurrently, it is likely that more than one thin client will have missed the same segments.

Figure 5:
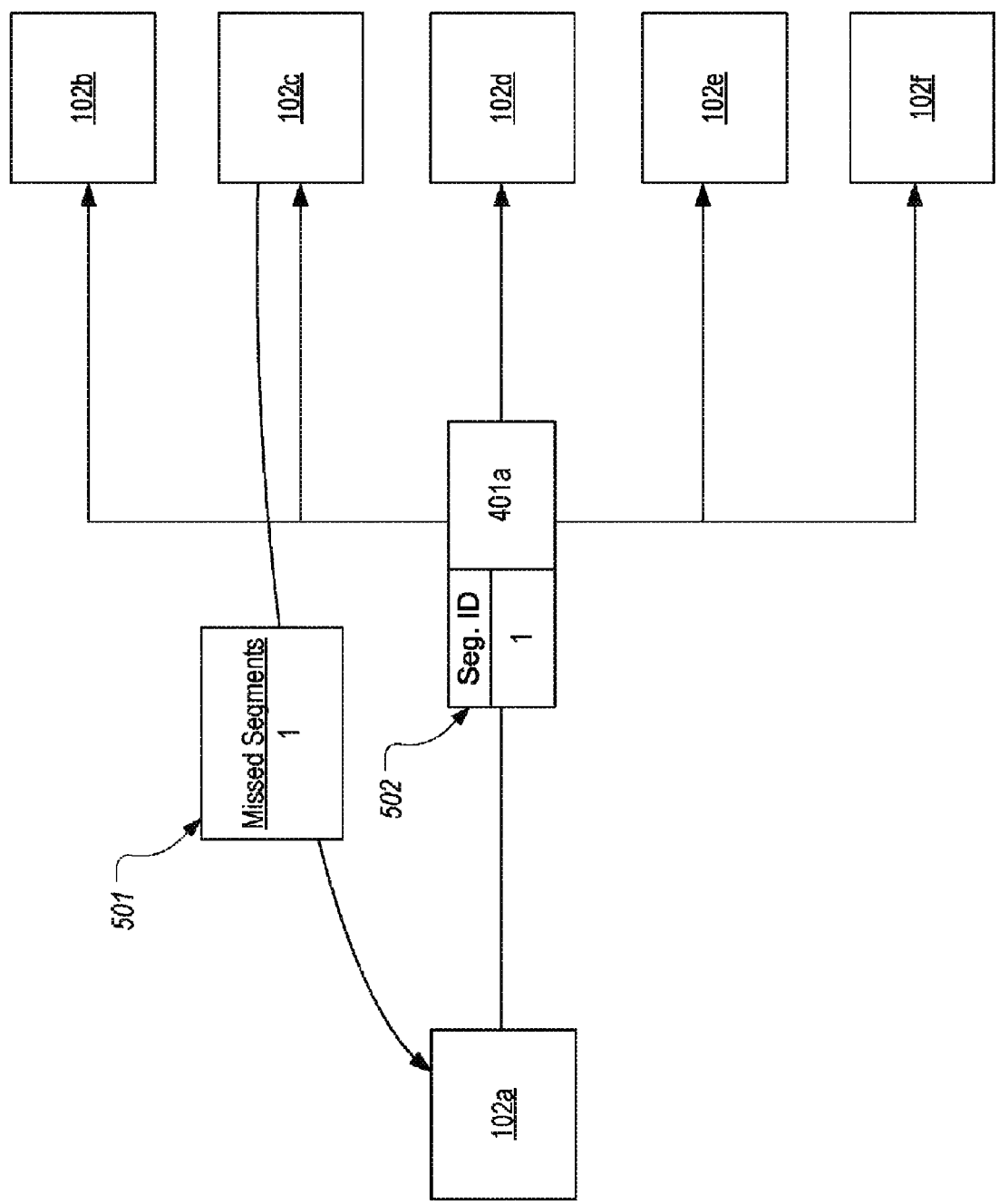
FIG. 5 illustrates how a client device can communicate that it did not receive a portion of an update and how the multicast server can re-multicast the portion that was not received.

By re-multicasting any segment missed by one thin client, any other thin client that may have missed the same segment may receive it as part of the re-multicast. This can eliminate duplicate transmissions. For example, FIG. 5 represents a scenario where client device 102c has sent a communication 501 to client device 102a (which is acting as the multicast server) that identifies each segment (e.g., segment 401a as identified by its identifier 1) that client device 102b did not receive as part of the multicast. It will be assumed that client devices 102d-102f also did not receive these segments. In some embodiments, communication 501 can be sent directly to client device 102a such as by using client device 102a's IP address (as opposed to the IP address used for the multicast) which may have been provided in the control information periodically multicast. Alternatively, communication 501 could be transmitted using the multicast IP address. In either case, in response to communication 501, client device 102a can again multicast the missed segment (which is generally represented in FIG. 5 as a UDP payload 502).

It is emphasized that this re-multicasting of the segment 401a does not occur as part of an underlying protocol. For example, segment 401a is re-multicast, not as part of TCP's delivery guarantee mechanism, but because a multicast component 201 (which executes at the application layer) on a receiving client device 102 communicates to the multicast server which segments it did not receive.

Because each missed segment is again multicast, each of client devices 102c-102f (as well as all other client devices still listening for the multicast) can receive them. Accordingly, each client device can be configured to continue listening for a multicast even after the multicast server has completed the initial multicasting of the update so that the client device can receive any segments that it may have missed. This re-multicasting of missed segments further reduces the bandwidth required to complete the transfer of the full update to all client devices. The re-multicasting also reduces the load on the multicasting server. For example, if missed segments were transmitted directly to each client device (as opposed to being multicast), a much greater load would be placed on the multicasting server making it less feasible for a thin client to function as the multicasting server. Directly transmitting missed segments would also require substantially more time. The re-multicasting of missed segments therefore provides both bandwidth and time efficiencies.

Figure 6:
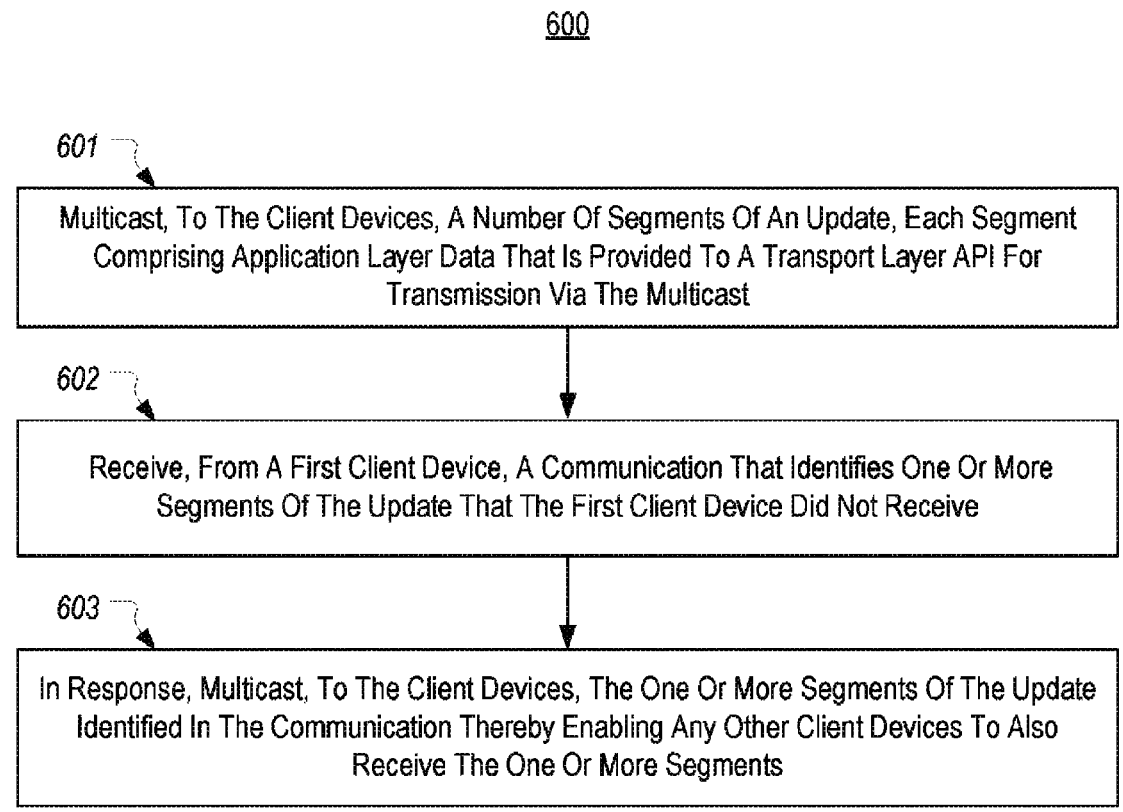
FIG. 6 illustrates a flowchart of an example method for multicasting an update to a number of client devices.

FIG. 6 provides a flowchart of a method 600 for multicasting an update to a number of client devices. Method 600 can be performed by a multicast server which in some embodiments may be a thin client that is selected from among a number of thin clients that are to be updated.

Method 600 includes an act 601 of multicasting, to the client devices, a number of network packets that each include a portion of an update. For example, client device 102a can multicast packets 400a-400n that each contain a portion of an update.

Method 600 includes an act 602 of receiving, from a first client device, a communication that identifies one or more portions of the update that the first client device did not receive. For example, client device 102a can receive communication 501 from client device 102b identifying one or more portions of the update that client device 102b did not receive as part of the multicast.

Method 600 includes an act 603 of multicasting, to the client devices, additional network packets that include the one or more portions of the update that the first client device did not receive thereby enabling any other client devices to also receive the additional network packets. For example, client device 102a can multicast packet(s) 502 which contain the one or more portions of the update identified in communication 501.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a multicast server, for multicasting an update to a number of client devices, the method comprising:
    multicasting control information which defines a total size of an update and a segment size;
    multicasting, to the client devices, a number of segments of the update, each segment comprising application layer data that is provided to a transport layer API for transmission via the multicast;
    receiving, from a first client device, a communication that identifies one or more segments of the update that the first client device did not receive; and
    in response, multicasting, to the client devices, the one or more segments of the update identified in the communication thereby enabling any other client devices to also receive the one or more segments.

2. The method of claim 1, wherein the client devices are thin clients.

3. The method of claim 2, wherein the multicast server is a thin client.

4. The method of claim 1, wherein the update comprises an image of the multicast server.

5. The method of claim 1, further comprising:
    receiving, from a device management tool, a schedule identifying when to initiate the multicast.

6. The method of claim 1, wherein the size of each segment is selected by the multicast server based on one or more network conditions.

7. The method of claim 6, wherein the update is an image and the segment size corresponds with a size of two blocks of the image.

8. The method of claim 1, wherein multicasting comprises IP multicasting.

9. The method of claim 1, wherein the total size is defined as one of:
    a total number of bytes in the update; or
    a total number of segments in the update.

10. The method of claim 1, wherein the control information further defines a transmission rate of the segments.

11. The method of claim 1, wherein the control information is multicast one or both of prior to multicasting the segments or while multicasting the segments.

12. One or more computer storage media storing computer executable instructions which when executed by a multicast server implement a method for multicasting an update to a number of client devices, the method comprising:
    multicasting, to the client devices, control information which defines a total size of an update to be multicast and a segment size for segments of the update, each segment comprising application layer data that is provided to a transport layer API for transmission via the multicast;
    multicasting, to the client devices, the segments of the update;
    receiving, from a first client device, a communication that identifies one or more segments of the update that the first client device did not receive; and
    in response, multicasting, to the client devices, the one or more segments of the update identified in the communication thereby enabling any other client devices to also receive the one or more segments.

13. The computer storage media of claim 12, wherein the segment size corresponds to a size of a number of blocks of the update.

14. The computer storage media of claim 12, wherein each of the segments includes a sequential identifier that identifies a relative position of the segment within the update.

15. The computer storage media of claim 12, further comprising:
    receiving, from a second client device, a communication that identifies one or more segments of the update that the second client device did not receive; and
    in response, multicasting, to the client devices, the one or more segments of the update that the second client device did not receive.

16. The computer storage media of claim 15, wherein the one or more segments that the second client device did not receive are different than the one or more segments that the first client device did not receive.

17. The computer storage media of claim 15, wherein the multicast server and the client devices are thin clients.

18. A method for updating thin clients comprising:
    selecting one thin client from among the thin clients to function as a multicast server;
    transmitting a schedule to the thin clients, the schedule defining a time when an update will be multicast to the thin clients;
    multicasting control information that identifies a total size and a segment size for the update;
    at the scheduled time, multicasting, by the multicast server, the update to the thin clients;
    receiving, by the multicast server and from a first thin client, a communication that identifies one or more segments of the update that the first thin client did not receive during the multicast; and
    in response, re-multicasting the one or more segments.

19. The method of claim 18, wherein a device management tool selects the thin client to function as the multicast server.

20. The method of claim 18, wherein the total size is defined as one of:
   a total number of bytes in the update; or
   a total number of segments in the update.

* * * * *